US010384482B2

(12) United States Patent
Eng et al.

(10) Patent No.: US 10,384,482 B2
(45) Date of Patent: Aug. 20, 2019

(54) ACTUATED PRINT HEAD ASSEMBLY FOR A CONTOURED SURFACE

(71) Applicant: The Boeing Company, Chicago, IL (US)

(72) Inventors: Raymond C. Eng, Burien, WA (US); Kyle S. Biondich, Bothell, WA (US); Bennett M. Moriarty, Bothell, WA (US); Matthew H. Mellin, Charleston, SC (US); Justin T. Hoehn, Mountlake, WA (US); George P. Halamandaris, Newport, CA (US); John E. Miller, Ladson, SC (US); Jeffrey H. Olberg, Federal Way, WA (US); Shane E. Arthur, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 15/287,167

(22) Filed: Oct. 6, 2016

(65) Prior Publication Data

US 2018/0099518 A1    Apr. 12, 2018

(51) Int. Cl.
*B05B 1/14*    (2006.01)
*B05B 3/02*    (2006.01)
(Continued)

(52) U.S. Cl.
CPC ............. *B41M 5/0011* (2013.01); *B05B 1/14* (2013.01); *B05B 3/02* (2013.01); *B05B 13/005* (2013.01);
(Continued)

(58) Field of Classification Search
CPC ........ B41M 5/0088; B41J 3/4073; F16D 3/41
See application file for complete search history.

(56) References Cited

U.S. PATENT DOCUMENTS 4,328,257 A * 5/1982 Muehlberger .......... B05B 7/226
219/121.36
9,452,616 B1 9/2016 Mathis et al.
(Continued)

FOREIGN PATENT DOCUMENTS

EP 3290166 A1 3/2018
EP 3292914 A1 3/2018

OTHER PUBLICATIONS

Search Report for related European Application No. EP17194112.3; report dated Mar. 8, 2018.

*Primary Examiner* — Dah-Wei D. Yuan
*Assistant Examiner* — Stephen A Kitt
(74) *Attorney, Agent, or Firm* — Miller, Matthias & Hull LLP

(57) ABSTRACT

An applicator assembly for treating a contoured surface including an attachment frame configured to secure and position an applicator head. In some embodiments, the applicator head is configured to apply a surface treatment to the contoured surface. The applicator assembly further includes, at least one sensor operatively coupled to the attachment frame and configured to scan the contoured surface and produce a contoured data set. Additionally, the applicator assembly includes an applicator actuator operatively coupled to the attachment frame and configured to manipulate the attachment frame such that the applicator assembly maintains an orientation of the applicator assembly relative to the contoured surface.

13 Claims, 7 Drawing Sheets

(51) Int. Cl.
- *B05D 1/02* (2006.01)
- *B41M 5/00* (2006.01)
- *B64F 5/10* (2017.01)
- *B05B 12/04* (2006.01)
- *B05B 12/12* (2006.01)
- *B05B 13/00* (2006.01)
- *B05B 13/04* (2006.01)
- *B05B 15/68* (2018.01)
- *B41J 3/407* (2006.01)

(52) U.S. Cl.
CPC .......... *B05B 13/0431* (2013.01); *B05B 15/68* (2018.02); *B05D 1/02* (2013.01); *B41J 3/4073* (2013.01); *B64F 5/10* (2017.01); *B05B 12/04* (2013.01); *B05B 12/124* (2013.01)

(56) References Cited

U.S. PATENT DOCUMENTS

2007/0062383 A1* 3/2007 Gazeau .................. B41J 3/4073
101/35
2008/0252671 A1 10/2008 Cannell et al.
2009/0169719 A1* 7/2009 Orr ........................ B41J 3/4073
427/8

* cited by examiner

ACTUATED PRINT HEAD ASSEMBLY FOR A CONTOURED SURFACE

FIELD

The present disclosure relates generally to automated surface treatment systems and methods, and more specifically to actuated print heads for contoured surfaces.

BACKGROUND

Treating and coating structural surfaces of machines, such as commercial aircraft, is a long and extensive process. Surface treatment often requires coating a structural surface that includes a variety of large contoured surfaces. Furthermore, coating the structural surfaces includes applying multiple layers of coatings for engineering properties, as well as to apply a decorative livery. The decorative livery is applied using a complex process which requires a series of masking operations followed by applying colored paints or coatings where they are needed. These masking and painting operations are serially repeated until the exterior surface treatment is completed. Performing these processes on large areas with a variety of contoured surfaces, therefore, requires a significant amount of time and resources.

SUMMARY

In accordance with one aspect of the present disclosure an applicator assembly for treating a contoured surface is disclosed. The applicator assembly includes an attachment frame configured to secure and position an applicator head. In some embodiments, the applicator head is configured to apply a surface treatment to the contoured surface. The applicator assembly further includes, at least one sensor operatively coupled to the attachment frame and configured to scan the contoured surface and produce a contoured data set. Additionally, the applicator assembly includes an applicator actuator operatively coupled to the attachment frame and configured to manipulate the attachment frame such that the applicator assembly maintains an orientation of the applicator assembly relative to the contoured surface.

In accordance with another aspect of the present disclosure, surface treatment array for treating a contoured surface is disclosed. The surface treatment array includes an adjustable base having at least a first radius and a second radius. The surface treatment array further includes a plurality of applicator assemblies coupled to the adjustable base and each applicator assembly having an attachment frame configured to support and position an applicator head. Moreover, at least one sensor is operatively coupled to each attachment frame, and each sensor is configured to scan the contoured surface and produce a contoured data set. The surface treatment array further includes, an adjustable base actuator operatively coupled to the adjustable base and configured to manipulate the adjustable base between at least the first radius and the second radius. Additionally, the surface treatment array includes an applicator actuator operatively coupled to each attachment frame, and configured to manipulate the attachment frame such that each applicator assembly maintains an orientation relative to the contoured surface. Moreover, the surface treatment array includes a controller communicably coupled to the adjustable base actuator and programmed to operate the adjustable base actuator to manipulate the adjustable base between at least the first radius and the second radius, and to selectively operate each applicator assembly to apply a surface treatment to the contoured surface.

In accordance with yet another aspect of the present disclosure, a method of treating a contoured surface with a surface treatment array is disclosed. The surface treatment method includes providing a plurality of applicator assemblies on an adjustable base, and each applicator assembly being configured to apply a surface treatment to the contoured surface. The method further includes determining an existing shape of the contoured surface and manipulating the adjustable base with an adjustable base actuator to a desired base contour based on the determined existing shape of the contoured surface, thereby to position each applicator assembly relative to the contoured surface. Moreover, the method of treating the contoured surface further includes manipulating an applicator actuator operatively coupled to each applicator assembly to maintain an orientation of each applicator assembly relative to the contoured surface. Additionally, the method of treating the contoured surface includes selectively operating the plurality of applicator assemblies to apply the surface treatment along the contoured surface.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both devices and methods for carrying out the disclosure. Actual scope of the disclosure is defined by the appended claims.

Figure 1:
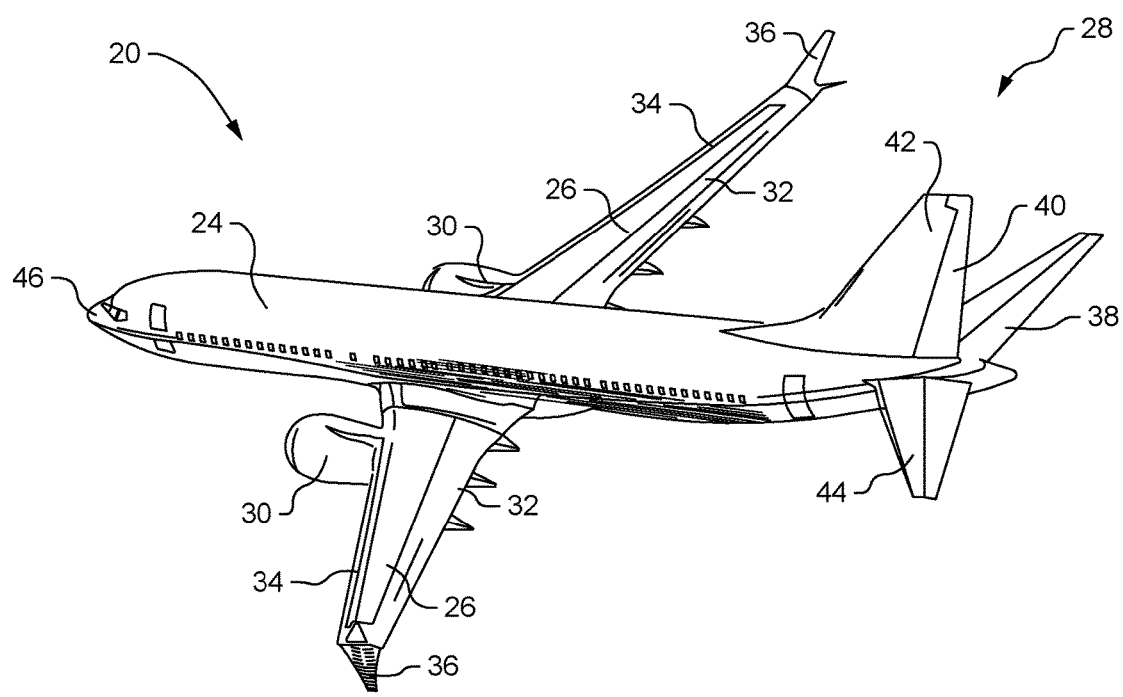
FIG. 1 is a perspective view of an exemplary vehicle constructed in accordance with the present disclosure.

Referring to FIG. 1, a vehicle 20 is illustrated. One non-limiting example of the vehicle 20 is that of an aircraft; however the present disclosure applies to other types of vehicles and machines as well. As illustrated, the vehicle 20 is configured with an airframe 22 which includes a fuselage 24, wings 26, and a tail section 28. In some embodiments, one or more propulsion units 30 are coupled to each wing 26 in order to propel the vehicle 20 in a direction of travel. Furthermore, the wings 26 are fixedly attached to the fuselage 24 and the propulsion units 30 are attached to an underside surface of the wing 26, however other attachment locations of the propulsion units 30 are possible. In some embodiments, the wings 26 are positioned at a substantially centered position along the fuselage 24, and the wings 26 are configured to include a plurality of flaps 32, leading edge devices 34, and peripheral edge devices 36 (i.e., winglets). Moreover, during operation of the vehicle 20, the flaps 32, leading edge devices 34 and peripheral edge devices 36 are capable of being adjusted in a plurality of positions in order to control and stabilize the vehicle 20. For example, the flaps 32 and leading edge devices 34 are adjustable in several different positions to produce the desired lift characteristics of the wings 26. Additionally, the tail section 28 of the airframe 22 includes components which provide other stability and maneuverability functions of the vehicle 20, such as an elevator 38, a rudder 40, a vertical stabilizer fin 42, and a horizontal stabilizer 44.

Figure 2:
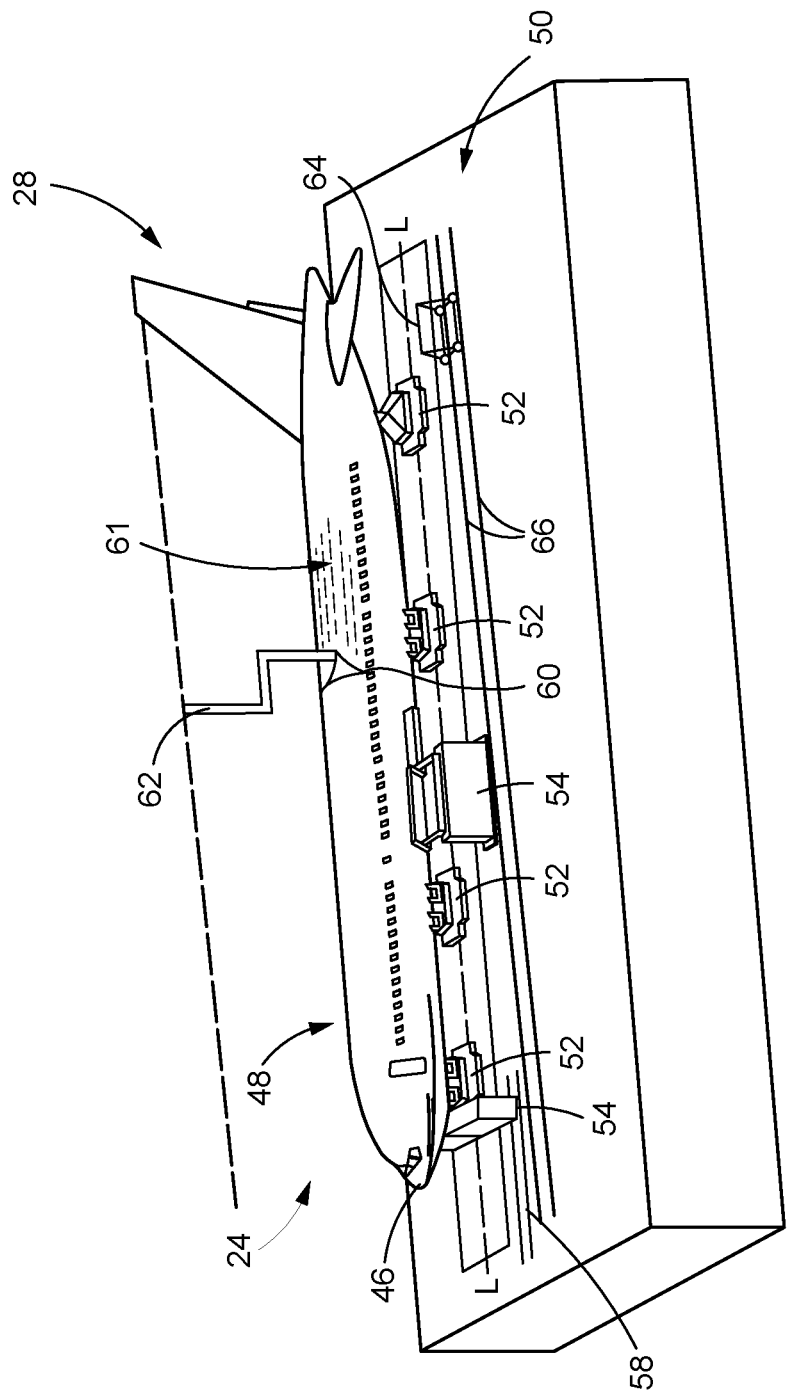
FIG. 2 is a perspective view of an exemplary contoured surface, and surface treating array in accordance with the present disclosure.

FIG. 2 illustrates one non-limiting example of the fuselage 24 with the tail section 28 attached. Generally, the fuselage 24 and other components of the vehicle 20 are constructed out of aluminum, aluminum alloy, titanium, carbon composite, or other known material. Moreover, the fuselage 24 forms a tubular structure of the vehicle 20. In some embodiments, a nose portion 46 is designated as the front of the fuselage 24 and the tail section 28 is designated as the rear of the fuselage 24. Additionally, the fuselage 24 is a tubular structure which exhibits changing dimensions and topography along the length of the fuselage 24 between the nose portion 46 and the tail section 28. As a result, the fuselage 24 is often described as having a contoured profile or surface 48. In one embodiment, the contoured surface 48 includes a variety of surface profiles formed by a series of changing surface geometries of the fuselage 24 and other vehicle 20 components. For example, moving along the fuselage 24 from the nose 46 to the tail section 28 the contoured surface 48 exhibits changing geometries and profiles such as but not limited to, an increase or decrease in diameter, a convex surface, a concave surface, or other such surface geometries and profiles or combination thereof.

During vehicle 20 manufacture and/or servicing, the fuselage 24, and other vehicle components, is positioned within a work area 50 and prepared for one or more manufacturing or scheduled service steps. In some embodiments, the manufacturing and/or servicing of the vehicle 20 includes providing one or more surface treatments to the contoured surface 48 along the fuselage 24, wings 26, tail section 28, or other portions of the vehicle 20. Generally, the surface treatment of the contoured surface 48 includes one or more of cleaning, abrading, priming, painting, protecting, repairing, or other known surface treatments of the contoured surface 48. Moreover, one non-limiting example of the treatment of the contoured surface 48 includes applying a decorative livery coating. The livery coating provides surface protection against the harsh environmental conditions encountered by the vehicle 20, and a decorative design on the fuselage 24 to help identify and distinguish one vehicle 20 from another.

As further illustrated in FIG. 2, the fuselage 24 is prepared for surface treatments by positioning the fuselage 24 within the work area 50 prior to attaching, or otherwise coupling, the wings 26 and other components to the vehicle 20. However, in alternative embodiments, such as but not limited to, during service or maintenance of the vehicle 20, the surface treatment is possible with the wings 26, the tail section 28 and other components already attached to vehicle 20. Prior to the start of the surface treatment, the fuselage 24 is delivered to the work area 50 by a plurality of automated guided vehicles 52 (AGVs). In some embodiments, the AGVs 52 are positioned along the underside of the fuselage 24 to provide adequate support while the AGVs 52 move the fuselage 24 into treatment position. FIG. 2 shows the use of four AGVs 52, however alternative numbers of AGVs 52 (i.e., fewer or greater) are certainly possible.

After the AGVs 52 move the fuselage into the work area 50, one or more structures are positioned along the underside of the fuselage 24 to provide support during the surface treatment. In some embodiments, a nose support structure 54 is located on the underside of the nose portion 46 of the fuselage 24, and a central support structure 56 is positioned underneath of the central portion of the fuselage 24. Additionally, while the nose support structure 54 and the central support structure 56 are shown in FIG. 2, one or more additional support structures can be placed in other places along the fuselage 24 which require support, such as but not limited to, underneath the tail section 28.

In one non-limiting embodiment, the nose and central support structures 54, 56 are slidably supported by a set of support structure rails 58 and the nose and central support structures 54, 56 slide along the support structure rails 58 and are positioned underneath the fuselage 24 to ensure the fuselage 24, or other component of the vehicle 20, is properly supported. Furthermore, the nose and central support structures 54, 56 are configured such that they are able to move along the support structure rails 58 without interfering with the AGVs 52. As a result, the AGVs 52 are capable of being used along with the nose and central support structures 54, 56 to provide support the fuselage 24, and/or other components of the vehicle 20, during surface treatment. While FIG. 2 illustrates the use of AGVs 52 and the nose and central support structures 54, 56 to transport and support the fuselage 24 and other components of the vehicle 20, it will be known to those skilled in the art that other methods of positioning, supporting and transporting the fuselage 24 and other vehicle 20 components are possible.

As further illustrated in FIG. 2, the work area 50 is equipped with a surface treatment assembly 60 that is configured to apply a surface treatment layer 61 to the contoured surface 48 of the vehicle 20. In some embodiments, the surface treatment assembly 60 is attached to a gantry 62, which is configured to provide support and movement of the surface treatment assembly 60 within the work area 50. In one non-limiting example, the gantry 62 is attached to an overhead structure that runs the length L-L of the work area 50 that houses the fuselage 24 or other components of the vehicle 20 during surface treatment. The gantry 62 is configured to move the surface treatment assembly 60 along the length L-L of the work area 50 as it treats the contoured surface 48 of the vehicle 20.

Alternatively, instead of using the gantry 62, the surface treatment assembly 60 is mounted on a surface treatment AGV 64, similar to the AGVs 52 used to move the fuselage in and out of the work area 50. The surface treatment AGV 64 is configured to move along the length L-L of the work area 50 as the surface treatment assembly 60 treats the contoured surface 48 of the vehicle 20. In one embodiment, the surface treatment AGV 64 is coupled to a set of AGV rails 66, which are positioned laterally alongside the fuselage 24 and configured to run along the length L-L of the work area 50. Furthermore, some embodiments include two sets of the AGV rails 66 that are spaced apart within the work area 50 such that the fuselage 24 is positioned and substantially centered between the two sets of AGV rails 66. As a result, one or more surface treatment assemblies 60 are capable of being positioned on either side of the fuselage 24 during surface treatment of the contoured surface 48. In an alternative embodiment, the surface treatment AGV 64 is configured with a set of wheels, or other ground engaging elements, that do not require being mounted on the AGV rails 66, and the surface treatment AGV 64 travels along the floor of the work area 50 while the surface treatment assembly 60 treats the contoured surface 48 of the vehicle 20.

Figure 3:
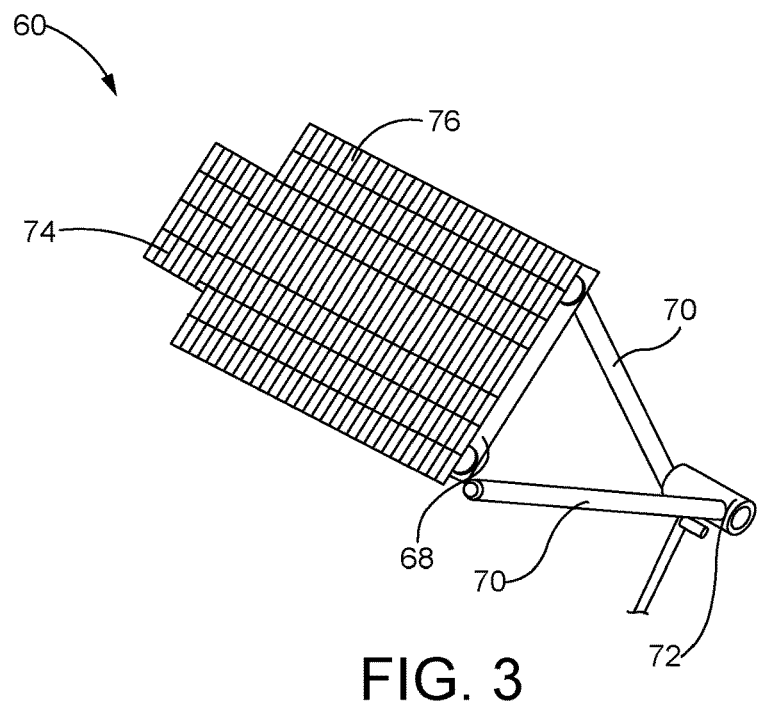
FIG. 3 is a perspective view of an exemplary surface treating array adjusted in a first radius, in accordance with the present disclosure.
Figure 4:
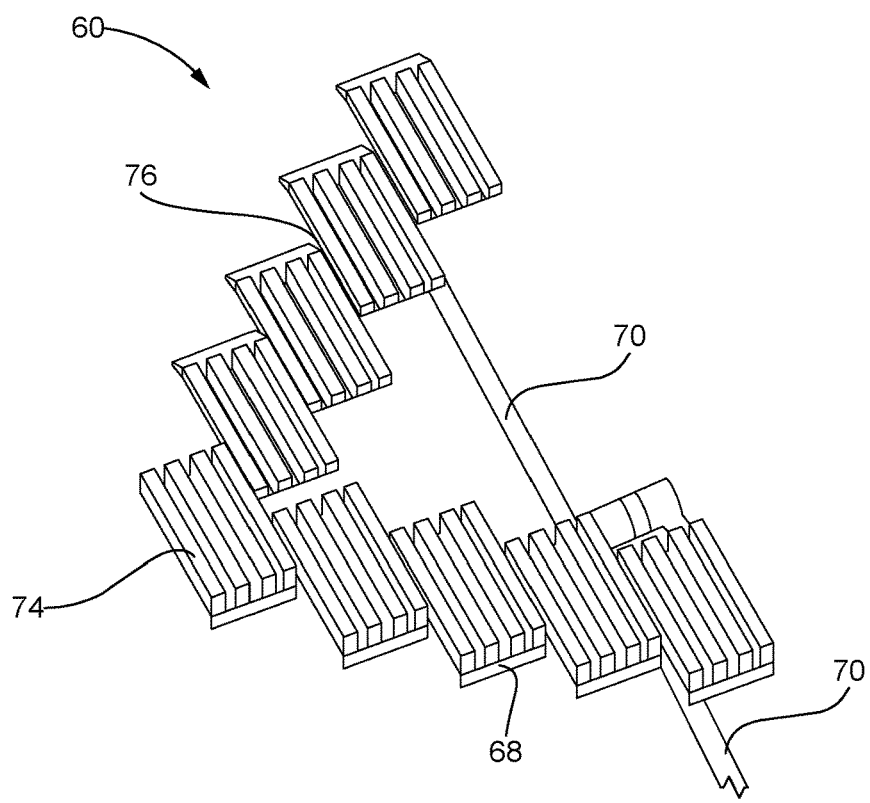
FIG. 4 is a side view of another embodiment of the surface treating array adjusted in a second radius, in accordance with the present disclosure.

Referring now to FIGS. 3-4, with continued reference to FIG. 2, an exemplary surface treatment assembly 60 is shown. In some embodiments, the surface treatment assembly 60 is adjustable between at least a first position (i.e., first radius) and a second position (i.e., second radius). For example, FIG. 3 shows the surface treatment assembly 60 collapsed down to treat a first diameter of the fuselage 24, while FIG. 4 shows the surface treatment assembly 60 expanded to treat a second diameter of the fuselage 24. As a result, to facilitate adjustment between the variable geometries of the fuselage 24, the surface treatment assembly 60 includes an adjustable base 68, one or more support arms 70 coupled to the adjustable base 68, and an adjustable base actuating device 72 operably coupled to the one or more support arms 70 of the surface treatment assembly 60.

In some embodiments, the adjustable base actuating device 72 is configured to adapt the adjustable base 68 of the surface treatment assembly 60 to conform and follow the variety of surface geometries and profiles (i.e., increased/decreased diameter, and convex/concave surfaces) encountered along the contoured surface 48 of the fuselage 24, or other component, of the vehicle 20. Moreover, in an exemplary configuration, the adjustable base 68 is configured for attaching a plurality of applicator assemblies 74 to the surface treatment assembly 60. Additionally, the plurality of applicator assemblies 74 are attached to the adjustable base 68 such that the plurality of applicator assemblies 74 forms a surface treatment array 76.

As further illustrated in FIG. 3, the surface treatment assembly 60 can be adjusted by the adjustable base actuating device 72 to collapse the surface treatment array 76 such that the plurality of applicator assemblies 74 are capable of treating a portion of the contoured surface 48 with a small diameter, or other such geometry and/or surface profile. Alternatively, as further illustrated in FIG. 4, with continued reference to FIG. 2, the surface treatment assembly 60 can be adjusted by the adjustable base actuating device 72 to expand or otherwise adjust, the surface treatment array such that the plurality of applicator assemblies 74 are capable of treating a portion of the contoured surface 48 with an increased diameter, or other such geometry and/or surface profile. While FIGS. 3-4 show two adjustable positions of the surface treatment assembly 60, it will be understood that the adjustable base 68 and adjustable base actuating device 72 are capable of adjusting the surface treatment assembly 60 to several positions to accommodate a variety of geometries and surface profiles of the contoured surface 48 of the fuselage 24.

Furthermore, in some positions of the surface treatment assembly 60, the surface treatment array 76 is arranged in a staggered formation, and each of the plurality of applicator assemblies 74 is independently controllable to maintain a desired orientation of each applicator assembly 74 relative to the contoured surface 48. The staggered arrangement of the plurality of applicator assemblies 74 in the surface treatment array 76 allows the surface treatment assembly 60 to make real-time adjustments to the plurality of applicator assemblies 74 to various surface geometries and profiles of the contoured surface 48. For example, each applicator assembly 74 is adjustable in order to maintain a normal or orthogonal orientation between the applicator assembly 74 and the contoured surface 48, to maintain a specified gap, (i.e., 5 millimeters) between the applicator assembly 74 and the contoured surface 48, or any other such adjustment which will maintain the desired orientation of each applicator assembly 74 relative to the contoured surface 48. Additionally, the staggered configuration of the surface treatment array 76 provides an overlap and/or redundancy of the plurality of applicator assemblies which allows the surface treatment assembly 60 to provide a uniform coating across the various surface geometries and profiles of the contoured surface 48.

Further illustrated in FIGS. 3-4, the surface treatment array 76, of the surface treatment assembly 60, is composed of a plurality of applicator assemblies 74. In some embodiments the plurality of applicator assemblies 74 include a plurality of inkjet nozzles, or other such fluid dispensing device, configured to dispense the surface coating (i.e., ink, primer, paint, clear coat) on the contoured surface 48 of the fuselage 24, or other component, of the vehicle 20. Furthermore, in some embodiments, to supplement the adjustability of the adjustable base 68 of the surface treatment assembly 60, the surface treatment array 76 also includes adjustment capabilities to account for the changing geometries of the contoured surface 48. In one non-limiting example, the plurality of applicator assemblies 74 is independently adjustable according to the changing dimensions and topography of the contoured surface 48 of the fuselage 24.

Referring back to FIG. 2, the surface treatment assembly 60 applies a surface treatment layer 61 to the contoured surface 48 of the fuselage 24, or other component, of the vehicle 20. In one embodiment, the plurality of applicator assemblies 74 of the surface treatment array 76 apply the surface treatment layer 61 to the contoured surface 48 as the surface treatment assembly 60 is moved by the gantry 62, the surface treatment AGV 64, or other such device, from the tail section 28 to the nose portion 46 of the fuselage 24. Alternatively, the surface treatment assembly 60 is positioned at an intermediate location along the fuselage 24 by the gantry 62, the surface treatment AGV 64, or other such device, and the plurality of applicator assemblies 74 of the surface treatment array 76 apply the surface treatment layer 61 on at least a portion of the contoured surface 48 of the fuselage 24.

The surface treatment assembly 60 is capable of being configured to apply a plurality of coatings which, either alone or in combination, compose the surface treatment layer 61. For example, the surface treatment assembly 60 is capable of applying a plurality of surface coatings, such as but not limited to, a surface protective layer, an adhesion promoting layer, a primer layer, a basecoat layer, a top coat layer, a clear coat layer, a decorative livery coating, or other known coatings. Moreover, the surface treatment assembly 60 is configured to jet, spray, print, or otherwise apply the surface treatment layer 61 onto the contoured surface 48 in a single pass as the surface treatment assembly 60 moves along the contoured surface 48 of the fuselage 24.

In some embodiments, the surface treatment layer 61 is composed of a single surface coating and is dispensed in a single pass along the contoured surface 48. However, additional numbers of passes are performed to apply the surface treatment layer 61 along the contoured surface 48, as needed. In one non-limiting example, the surface treatment assembly 60 is configured to apply a plurality of coatings that are combined to form the surface treatment layer 61 and the surface treatment assembly 60 is configured to dispense one coating at a time along the contoured surface 48 of the fuselage. As a result, the surface treatment assembly 60 makes one or more passes to dispense each of the plurality of coatings that comprise the surface treatment layer 61. Alternatively, two or more surface treatment assemblies 60 are configured to each apply a single coating as each of the two or more surface treatment assemblies 60 move along the contoured surface 48 of the fuselage 24 to dispense the plurality of coatings that comprise the surface treatment layer 61.

Figure 5:
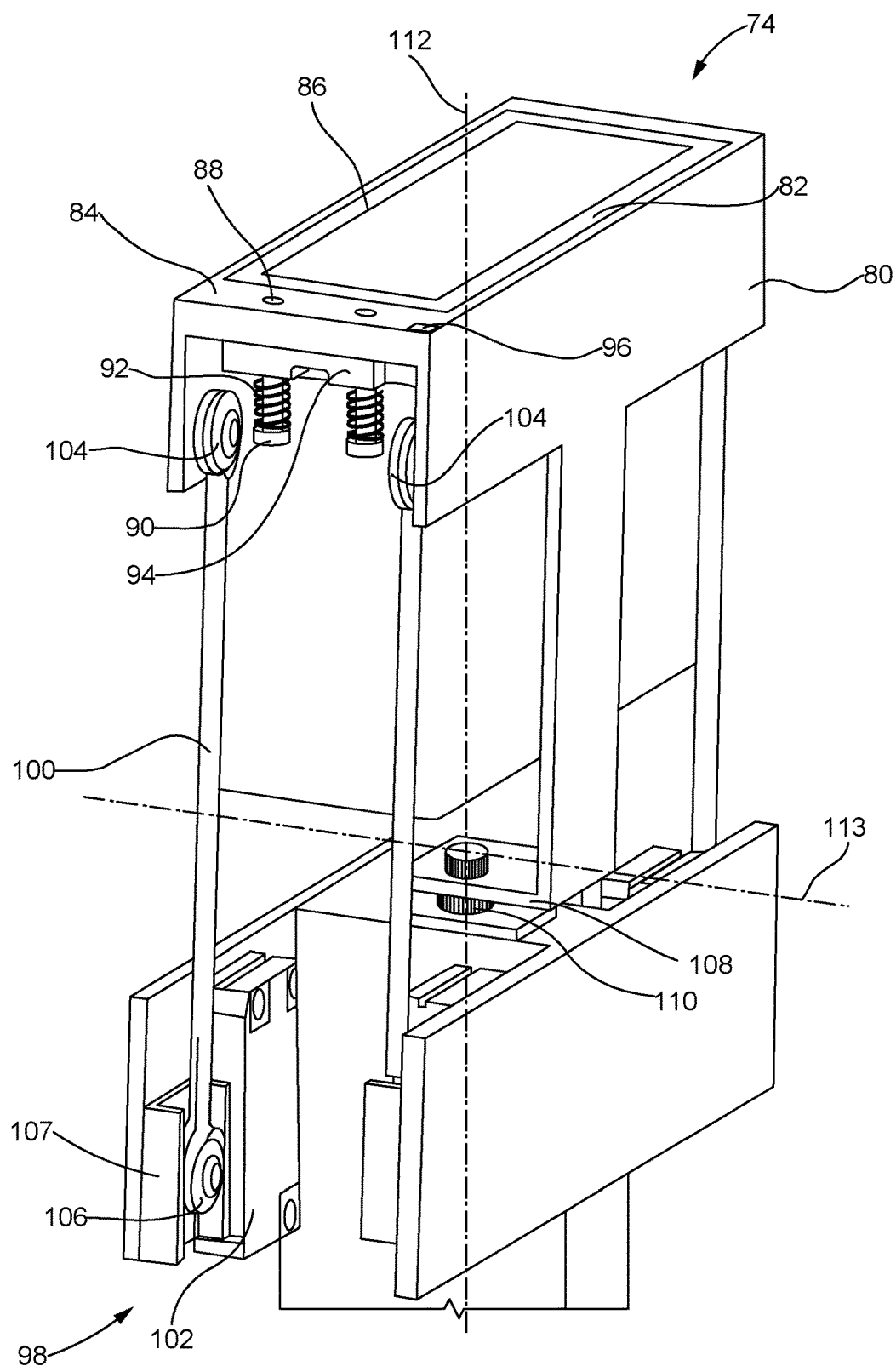
FIG. 5 is a perspective view of an exemplary applicator assembly incorporated into the surface treating array of FIGS. 3-4, in accordance with the present disclosure.

Referring now to FIG. 5, an exemplary applicator assembly 74 is shown. As described above, in one non-limiting example, a plurality of applicator assemblies 74 are coupled to the adjustable base 68 and arranged to form the surface treatment array 76. Generally, each applicator assembly 74 of the surface treatment array 76 includes an attachment frame 80 configured to hold and position the applicator head 82 which in turn is configured to apply the surface treatment layer 61 on the contoured surface 48. Furthermore, in some embodiments, the applicator head 82 of the applicator assembly 74 includes a plurality of inkjet nozzles or other such fluid dispensing device, configured to dispense the surface treatment layer 61 (i.e., ink, primer, paint, clear coat) on the contoured surface 48 of the fuselage 24, or other component, of the vehicle 20.

Additionally, the attachment frame 80 includes an applicator surface 84 with an applicator opening 86 configured to position and secure the applicator head 82 within the attachment frame 80. For example, one or more attachment holes 88 are formed in the applicator surface 84 and an attachment device 90, such as a screw, a pin, or other such device, is inserted into each of the attachment holes 88 to fasten and secure the applicator head 82 to the attachment frame 80. As a result, the applicator head 82 is positioned and aligned to be substantially planar with the applicator surface 84. In some embodiments, each of the attachment devices 90 incorporates an attachment device spring 92 and an attachment tab 94 to hold and position the applicator head 82 within the attachment frame 80. Furthermore, each of the attachment devices 90 and attachment device springs 92 are aligned with the attachment tab 94 and inserted into the attachment holes 88. The attachment devices 90 are tightened, or otherwise secured, such that the spring 92 and the attachment tab 94 apply a securing pressure on the applicator head 82 which holds the applicator head within the attachment frame 80.

The attachment frame 80 further includes at least one sensor 96 mounted on, or otherwise incorporated with, the applicator surface 84 or other location on the attachment frame 80 of the applicator assembly 74. In one non limiting example, the at least one sensor 96 is a surface scanning laser configured to scan and collect surface topography data of the contoured surface 48 and the surrounding areas. Furthermore, each sensor 96 is configured to collect metrology and other surface profile data, such as but not limited to, surface roughness data, surface imaging data, location/positioning data, height sense data, angular orientation data, and any other such surface data related to the control and adjustment of the surface treatment assembly 60. It will be understood that laser scanning sensors are one type of sensor 96 to be used, however, other sensors and/or combinations of different sensors, such as an interferometer, a capacitive transducer, a camera, or other such sensor, can be incorporated with the attachment frame 80, and configured to collect data needed for the adjustment and control of the surface treatment assembly 60.

As discussed above, each applicator assembly 74 of the surface treatment array 76 is independently adjustable to maintain the desired orientation of each applicator assembly 74 relative to the contoured surface 48. For example, the data collected by the at least one sensor 96 incorporated with each applicator assembly 74 is used by the surface treatment assembly 60 to make real-time adjustments to maintain a normal orientation and a specified gap between the applicator assembly 74 and the contoured surface 48. Additionally, the data collected by the at least one sensor 96 can be used for any other such adjustment to ensure the uniform application of the surface treatment layer 61 along the contoured surface 48.

In one non-limiting example, the applicator assembly 74 further incorporates a linear actuation device 98 which includes at least two linear rods 100 and one or more actuation device 102 (i.e., piezoelectric actuator, ball-screw actuator, or other linear actuator). The linear actuation device 98 is configured to provide the necessary independent adjustment and control of each applicator assembly 74 of the surface treatment array 76. In some embodiments, the linear rods 100 are rotatably coupled to the attachment frame 80 at rod first ends 104 and rotatably coupled to the actuation device 102 at rod ends second 106. In some non-limiting examples, each rod second end 106 is positioned within a slide truck 107, or other sliding device. The rod second end 106 and slide truck 107 are positioned adjacent to the actuation device 102 and configured to slide, rotate, and otherwise actuate the applicator assembly 74 Additionally, the attachment frame 80 includes an attachment frame base 108 configured to pivot and/or rotate about a gimbal 110. In some embodiments, the actuation device 102 is controlled to actuate the linear rods 100 such that the gimbal 110 pivots or rotates the attachment frame 80 about a first applicator assembly axis 112 and a second applicator assembly axis 113. Moreover, the at least two linear rods 100, the actuation device 102, and the gimbal 110 are configured to provide several degrees of freedom that are used to adjust the attachment frame 80 to maintain a normal orientation relative to the contoured surface and a specified gap between the applicator assembly 74 and the contoured surface 48.

Figure 6:
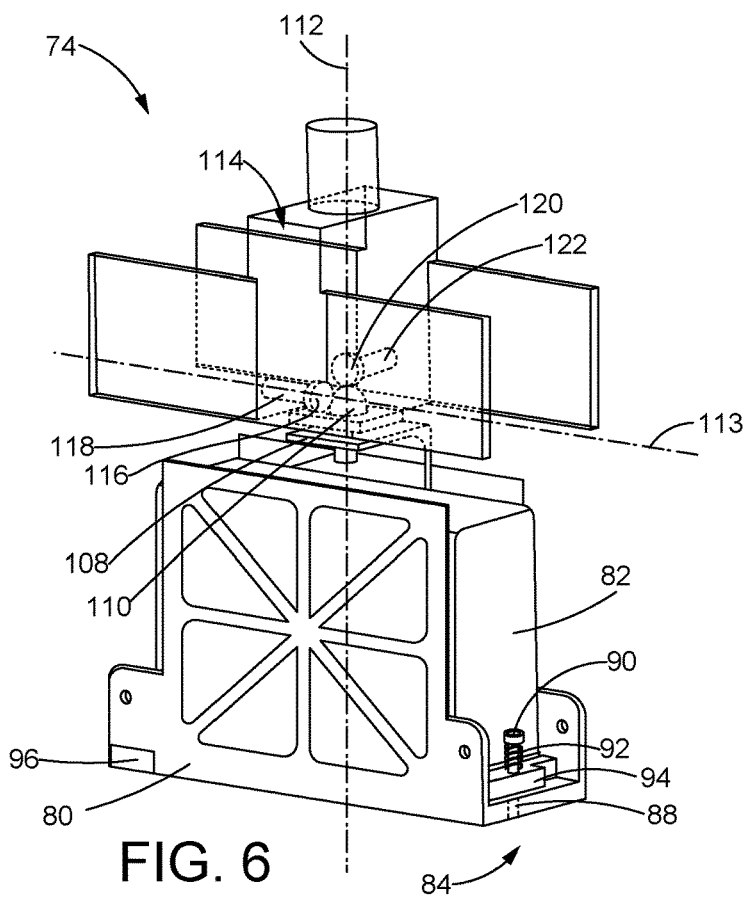
FIG. 6 is a perspective view of an additional embodiment of the applicator assembly incorporated into the surface treating array of FIGS. 3-4, in accordance with the present disclosure.
Figure 7:
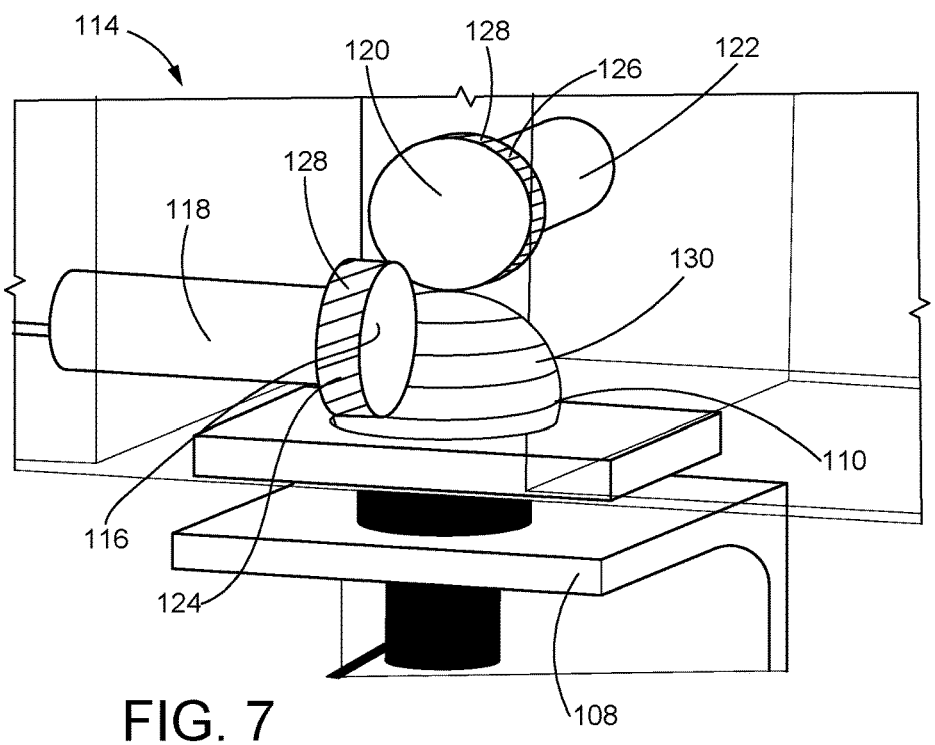
FIG. 7 is an enlarged perspective view of an actuator of the applicator assembly of FIG. 6, in accordance with the present disclosure.

Referring now to FIGS. 6-7, an additional embodiment of the applicator assembly 74 is shown. As described above, a plurality of applicator assemblies 74 are coupled to the adjustable base 68 and arranged to form the surface treatment array 76. Generally, the applicator assembly 74 includes an attachment frame 80 configured to hold and position the applicator head 82 which in turn is configured to apply the surface treatment layer 61 on the contoured surface 48. In some embodiments, the attachment frame 80 includes an applicator surface 84 with an applicator opening 86 (shown in FIG. 5) configured to position and secure the applicator head 82 within the attachment frame 80. For example, one or more attachment holes 88 are formed in the attachment frame 80 and an attachment device 90, such as a screw, a pin, or other such device, is inserted into each of the attachment holes 88 to hold the applicator head 82 within the attachment frame 80. As a result, the applicator head 82 is positioned and aligned substantially planar to the applicator surface 84. Additionally, in some embodiments, each attachment device 90 incorporates an attachment device spring 92 and an attachment tab 94 to hold and position the applicator head 82 within the attachment frame 80. Furthermore, each attachment device 90 and attachment device spring 92 are aligned with the attachment tab 94 and inserted into the attachment hole 88. The attachment device 90 is tightened or otherwise secured such that the spring 92 and the attachment tab 94 apply a securing pressure on the applicator head 82 which holds the applicator head within the attachment frame 80.

The attachment frame 80 further includes at least one sensor 96 incorporated with the applicator surface 84 or other location on the attachment frame 80 of the applicator assembly 74. In one non limiting example, the at least one sensor 96 is a surface scanning laser configured to scan and collect surface topography and other surface profile data of the contoured surface 48 and the surrounding areas. Furthermore, the at least one sensor 96 is configured to collect metrology and other surface profile data, such as but not limited to, surface roughness, surface imaging data, location/positioning data, height sense data, angular orientation data, and any other such surface data related to the control and adjustment of the surface treatment assembly 60. It will be understood that while laser scanning sensors are one type of sensor 96 to be used, other sensors and/or a combination different sensors, such as an interferometer, a capacitive transducer, a camera, or other such sensor, can be incorporated with the attachment frame 80 and configured to collect data needed for the adjustment and control of the surface treatment assembly 60.

As discussed above, each applicator assembly 74 of the surface treatment array 76 is independently adjustable in order to maintain the desired orientation of each applicator assembly 74 of the surface treatment array 76 with the contoured surface 48. For example, the data collected by the at least one sensor 96 provided with each applicator assembly 74 is used by the surface treatment assembly 60 to make real-time adjustments to maintain a normal orientation relative to the contoured surface 48 and a specified gap between the applicator assembly 74 and the contoured surface 48. Additionally, the data collected by the at least one sensor 96 can be used for any other such adjustment to ensure the uniform application of the surface treatment layer 61 along the contoured surface 48.

In one non-limiting example best illustrated in FIGS. 6-7, the applicator assembly 74 further incorporates a micro-wheel actuation device 114 which includes one or more micro actuation devices. In one non-limiting example the micro-wheel actuation device 144 includes a first micro-wheel 116 rotatably coupled to a first electric motor 118 and a second micro-wheel 120 rotatably coupled to a second electric motor 122. However, it will be understood that a fewer or greater number of micro-wheels and electric motors can be incorporated with the micro-wheel actuation device 114 as needed. The micro-wheel actuation device 114 is configured to provide the necessary independent adjustment and control of each applicator assembly 74 of the surface treatment array 76. As a result, in one non-limiting example, the first and second electric motors 118, 122 are configured to independently drive the first and second micro-wheels 116, 120, respectively. Moreover, in some embodiments, the circumference of the first micro-wheel 116 has a first wheel surface 124, and the circumference of the second micro-wheel 120 has a second wheel surface 126. Additionally, each of the first and second wheel surfaces 124, 126 include a wheel micro-texture 128 which is configured to engage with a micro-texturing on the surface of the gimbal 110.

Additionally, the attachment frame 80 includes the attachment frame base 108 configured to pivot and/or rotate about the gimbal 110, and the first and second wheel surfaces 124, 126 of the first and second wheels 116, 120 are coupled to the surface of the gimbal 110. As described above, in some embodiments the first and second electric motors 118, 122 are independently controlled to rotatably drive the first and second wheels 116, 120. Furthermore, the wheel micro-texture 128 on the first and second wheel surfaces 124, 126 interacts with and the gimbal texture 130 on the surface of the gimbal 110 such that the gimbal 110 allows the attachment frame 80 to pivot or rotate about the first applicator assembly axis 112 and/or the second applicator assembly axis 113. Moreover, the micro-wheel actuation device 114 is configured to provide several degrees of freedom that are available for the adjustment of the attachment frame 80 to maintain a normal orientation and a specified gap between the applicator assembly 74 and the contoured surface 48.

Figure 8:
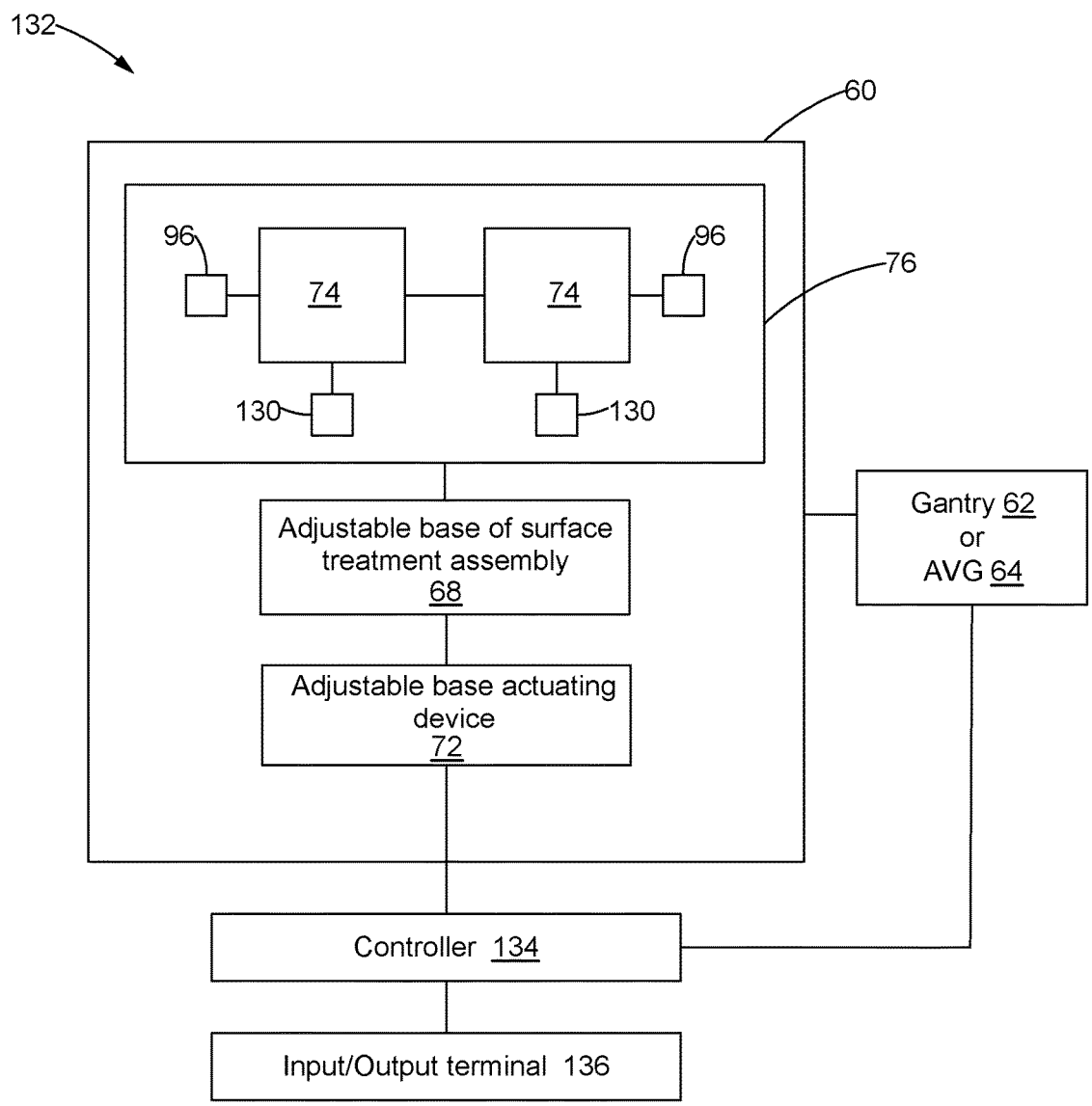
FIG. 8 is a schematic view of an exemplary control and communication system in accordance with the present disclosure.

FIG. 8 illustrates a schematic of a control and communication system 132 that is configured to operate and monitor the surface treatment assembly 60. The control and communication system 132 is composed of a controller 134 and an input/output terminal 136 which is communicably coupled to the controller 134. Furthermore, the controller 134 is programmed to control the movement of the surface treatment assembly 60, as well as, to control the independent movement and adjustment of the each applicator assembly 74 of the surface treatment array 76. In some embodiments, the controller 134 and the input/output terminal 136 are located remotely from the work area 50. As a result, communication between the controller 134, the input/output terminal 136 and the surface treatment assembly 60 is established using a radio frequency network, a computer data network, a Wi-Fi data network, a cellular data network, a satellite data network, or any other known data communication network. Alternatively, the controller 134 and the input/output terminal 136 are configured to be proximally located in the work area 50 and set up in a position adjacent to the surface treatment assembly 60. In the proximally located configuration, the controller 134 and the input/output terminal 136 are similarly configured to communicate using a radio frequency network a computer data network, a Wi-Fi data network, a cellular data network, a satellite data network or any other known communication network.

A user of the control and communication system 132, such as an operator, a supervisor, or other interested personnel, can access the controller 134 using the input/output terminal 136. In some embodiments, the input/output terminal 136 allows for commands and other instructions to be input through a keyboard, mouse, dial, button, touch screen, microphone or other known input devices. Furthermore, data and other information generated by the control and communication system 132 and the controller 134 will be output to the input/output terminal 136 through a monitor, touch screen, speaker, printer, or other known output device for the user. In some embodiments, the input/output terminal 136 is communicably coupled to the controller 134 through a wired connection. Alternatively, the input/output terminal 136 is communicably coupled to the controller 134 through a wireless communication network such as Bluetooth, near-field communication, a radio frequency network, a computer data network, a Wi-Fi data network, a cellular data network, a satellite data network or any other known data communication network. In some embodiments, the input/output terminal 136 is a handheld mobile device, such as a tablet computer, a smart phone device, or other such mobile device, and the handheld mobile device is wirelessly coupled to the controller 134. As a result, one or more users of the control and communication system 132 can access the controller 134, each user having a different handheld input/output terminal 136 that is remotely located from the controller 134 and/or the surface treatment assembly 60. Such a configuration will allow for the flexibility in monitoring and operating the control and communication system 132 during treatment of the contoured surface 48 of the fuselage 24.

In some embodiments, the controller 134 of the control and communication system 132 is composed of one or more computing devices that are capable of executing a control mechanism and/or software which allows the user to direct and control the surface treatment assembly 60. The one or more computing devices of the controller 134 are programmed to control the movement of the gantry 62, the surface treatment AGV 64, or other movement device. Additionally, the controller 134 is programmed to control the movement and operation of the surface treatment assembly 60 within the work area 50. Furthermore, the one or more computing devices of the controller 134 are programmed to control the actuation and adjustment of the surface treatment assembly 60 to control the application of the surface treatment layer 61 on the contoured surface 48. In one exemplary application of the control and communication system 132, the operator or other user is able to control the controller 134 with the input/output terminal 136 to program a pattern or process for the surface treatment assembly 60 to execute while applying the surface treatment layer 61 along the contoured surface 48. Furthermore, communicably coupling of the controller 134, the input/output terminal 136, and the surface treatment assembly 60 through a communication network allows for two-way communication between the control and communication system 132 and the surface treatment assembly 60. For example, commands sent by the controller 134 are received by the surface treatment assembly 60, and data collected by the surface treatment assembly 60 is sent to and received by the controller 134.

In an embodiment, the at least one sensor 96 mounted on, or otherwise incorporated with, the surface treatment assembly 60 is communicably coupled to the controller 134 and the input/output terminal 136. In one non-limiting example, each of the applicator assemblies 74 of the surface treatment array 76 includes at least one sensor 96. Additionally or alternatively, a plurality of sensors 96 is mounted on other various locations of the surface treatment assembly 60. The data collected by the sensors 96 is transmitted to and utilized by the controller 134. Additionally, the controller 134 is programmed to store, analyze and extract information from the data collected by the at least one sensor 96, and use the extracted information to control and adjust the surface treatment assembly 60. For example, the at least one sensor 96 includes a sensor, such as but not limited to, a vision sensor (i.e., camera), a laser scanning topography and surface height sense sensor (i.e., LIDAR, and/or interferometer), and other such surface metrology sensors.

Additionally, the controller 134 and the surface treatment assembly 60 are operably coupled with one another to enable real-time adjustments to each applicator assembly 74 of the surface treatment array 76. For example, the controller 134 receives and analyzes the data collected by the at least one sensor 96 mounted on, or otherwise incorporated with, each applicator assembly 74. Moreover, each sensor 96 is configured to detect a change in the radius of the fuselage 24, collect imaging and vision data of the contoured surface 48, provide a topographical map of the contoured surface 48, provide positioning and location data of the surface treatment assembly 60, and provide any other such surface data collected. The controller 134 transmits a control signal or other such set of commands to the gantry 62 or surface treatment AGV 64, the adjustable base actuating device 72, and each applicator actuation device 138 (i.e., linear actuation device 98 or micro-wheel actuation device 114) to make adjustments to the control and operation of the surface treatment assembly 60. Furthermore, the controller 134 transmits a control signal, or other such set of commands, to the applicator head 82 of each applicator assembly in the surface treatment array 76 to apply the surface treatment layer 61 on the contoured surface 48.

Additionally, the user is able to view the data collected by the sensors 96 on the input/output terminal 136, and if necessary, input adjustments to the control signal commands sent from the controller 134 to the surface treatment assembly 60. In some embodiments, the control and communication system 132 is capable of making real-time adjustments to the surface treatment assembly 60 through the two-way communication link established between the surface treatment assembly 60 and the control and communication system 132.

Figure 9:
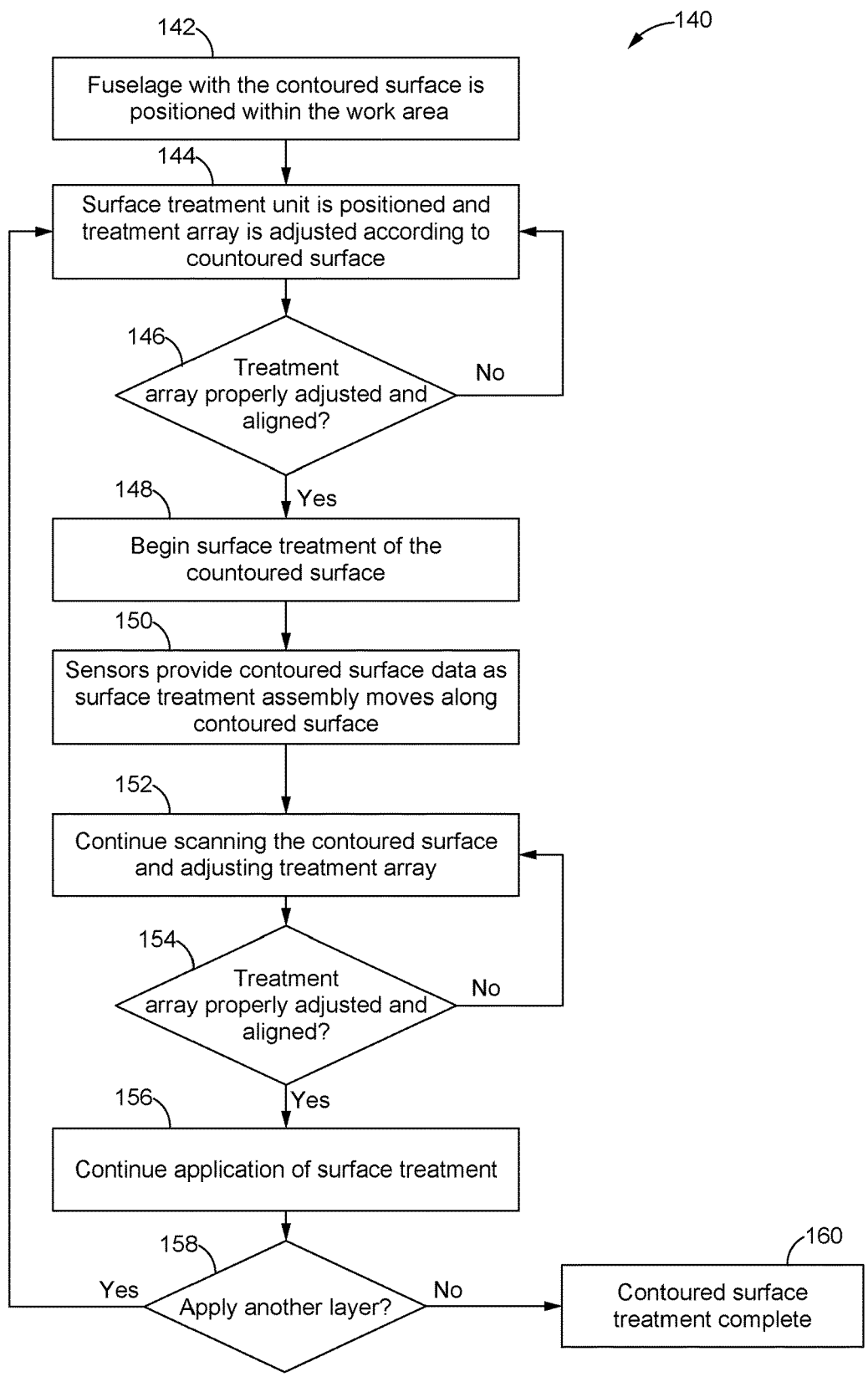
FIG. 9 is a flowchart illustrating an exemplary method of treating a contoured surface in accordance with the present disclosure.

Referring now to FIG. 9, and with continued reference to the proceeding FIGS. 1-7, a flowchart illustrating an exemplary surface treatment method or process 140 of treating a contoured surface is illustrated. In a first block 142, of the contoured surface treatment process 140, a structure having a contoured surface 48, such as an airplane fuselage 24, is prepared for surface treatment and positioned within the work area 50. In one non-limiting example, the surface preparation includes the removal of any protective or previously applied coatings on the contoured surface 48, masking certain areas of the contoured surface 48 not to be treated, abrading, cleaning, and drying the contoured surface 48, and any other surface preparations needed prior to the treatment of the contoured surface 48. Furthermore, prior to the start of the contoured surface treatment process 140, the structure including the contoured surface 48 (i.e., fuselage 24), is moved into the treatment position within the work area 50. In one non-limiting example, the fuselage 24 is transported into the work area 50 by one or more AGVs 52 and delivered to the nose support structure 54, the central support structure 56, and/or other support structures used to support the fuselage 24. During the contoured surface treatment process 140, the fuselage 24 is supported by the nose and central support structures 54, 56, the one or more AGVs 52 and any other support structures that may be needed.

In a next block 144 of the contoured surface treatment process 140, the surface treatment assembly 60 is positioned within the work area 50 and adjusted and aligned along the contoured surface 48 of the fuselage 24. In one non-limiting example, during the adjustment and alignment of the surface treatment assembly 60, at least one sensor 96 mounted on, or otherwise incorporated with, the surface treatment assembly 60 is configured to scan and collect the surface topography data of the contoured surface 48. The surface topography data is transmitted to, and received by, the controller 134, of the control and communication system 132, and the controller 134 transmits a control signal to the surface treatment assembly 60 which makes adjustments to the adjustable base 68 and the surface treatment array 76. Additionally, the data collected by the at least one sensor 96 is utilized by the controller 134 to generate and transmit a control signal to each of the plurality of applicator assemblies 74 of the surface treatment array 76. The control signal received by each of the plurality of applicator assemblies 74 makes adjustments to ensure a uniform application of the surface treatment layer 61. For example, each of the applicator assemblies 74 is adjusted to maintain a normal orientation and proper dispense gap between each applicator head 82 and the contoured surface 48. However, other adjustments are made as necessary to ensure the uniform application of the surface treatment layer 61.

According to a next block 146, prior to the application of the surface treatment layer 61, an adjustment check is performed to confirm that the surface treatment assembly 60 is properly adjusted and aligned relative to the contoured surface 48. In some embodiments, the adjustment check includes confirmation of the proper dispense gap between the contoured surface 48 and each applicator assembly 74. Additionally, the adjustment check confirms that each applicator assembly 74 is in a normal or orthogonal orientation relative to the contoured surface 48. Failure to properly adjust and align the surface treatment assembly 60 relative to the contoured surface 48 will result in a non-uniform application of the surface treatment layer 61, or other such defects. Therefore, if the inspection fails the set of predetermined adjustment criteria which are input into the controller 134, the surface treatment assembly 60 continues adjustment and alignment of each of the plurality of applicator assemblies 74 of the surface treatment array 76 to correct any adjustment errors. In some embodiments, the operator, or other user, of the surface treatment assembly will be notified of the adjustment errors and able to correct the adjustment and alignment of the surface treatment assembly 60 by inputting commands or other such instructions into the input/output terminal 136 of the control and communication system 132.

Once the surface treatment assembly 60 is properly adjusted and aligned, then in a next block 148 the surface treatment assembly 60 begins the application of the surface treatment layer 61. The surface treatment layer 61 includes at least one of a plurality of protective and preparation materials and coatings, such as but not limited to, a surface protective coating, an adhesion promoting coating, a primer coating, a basecoat coating, a sol-gel coating, a top layer coating, a decorative livery coating, a clear coating, and/or other protective and/or preparation coatings. In some embodiments, the surface treatment assembly 60 starts the application of the surface treatment layer 61 at the tail section 28 of the vehicle 20 and moves towards the nose portion 46 of the fuselage 24. As the surface treatment assembly 60 moves along the fuselage 24, each applicator assembly 74 dispenses one of the plurality of protective and preparation coatings, such as but not limited to, a surface protective coating, an adhesion promoting coating, a primer coating, a basecoat coating, a sol-gel coating, a top layer coating, a decorative livery coating, a clear coating, and/or other protective and/or preparation coatings. Alternatively, the surface treatment assembly 60 starts the application of the surface treatment layer 61 at an intermediate location between the tail section 28 and the nose portion 46, and the surface treatment assembly 60 dispenses the surface treatment layer 61 where directed.

In a next block 150, as the surface treatment assembly 60 moves along the contoured surface 48, the sensors 96 attached to the applicator assemblies 74 or portion of the surface treatment assembly 60, continue to scan and collect data of the contoured surface 48 topography. In some embodiments, the data collected by the sensors 96 is analyzed by the controller 134 to make real-time adjustments to the surface treatment assembly 60 as it dispenses the surface treatment layer 61. For example, each applicator assembly 74 is independently adjusted to maintain a normal or orthogonal orientation relative to the contoured surface 48. Furthermore, the controller 134 continues to receive and analyze the surface topography data collected by the plurality of surface treatment assembly sensors 90 as the surface treatment assembly 60 continues moving along the contoured surface 48 of the fuselage 24.

As a result, in a next block 152 the controller 134 and other components of the control and communication system 132 continuously perform alignment checks to confirm that each applicator assembly 74 is properly adjusted, aligned, and orientated. In some embodiments, if one or more of the applicator assemblies 74 is out of adjustment, alignment, and/or orientation, then the surface treatment assembly 60 will readjust those applicator assemblies 74. For example, the controller 134 will transmit a control signal to each of the applicator assemblies 74 and instruct the applicator actuation device 138 (i.e., linear actuation device 98 or microwheel actuation device 114) of each applicator assembly 74 to make the necessary adjustments and realignments.

In a next block 154, if it is determined the surface treatment array 76 is out of alignment, then the surface treatment assembly 60 stops moving along the contoured surface 48 of the fuselage 24 in order to perform the readjustment. In some embodiments, the contoured surface treatment process 140 returns to block 152 for readjustment and realignment of each applicator assembly 74. In an alternative embodiment, the surface treatment assembly 60 continues to move along the contoured surface 48 at a slower pace in order to perform the readjustment and realignment of each applicator assembly 74.

Provided the surface treatment assembly 60 passes the continuous adjustment, alignment, and orientation checks, then in a next block 156 the surface treatment assembly 60 will continue dispensing the surface treatment layer 61 as it moves along the contoured surface 48. In a next block 158, when the surface treatment assembly 60 reaches the nose portion 46, or other pre-determined stopping point along the fuselage 24, the controller 134 makes a determination of whether another surface coating is required. If another coating is required, then in one non-limiting example, the contoured surface treatment process 140, returns to block 144 and the surface treatment assembly 60 is positioned at the designated starting position (i.e., the nose portion 46, the tail section 28 or alternative pre-determined starting point), and prepares to dispense the next coating along the contoured surface 48 of the fuselage 24. In some embodiments, the same surface treatment assembly 60 is used to apply the subsequent coatings or layers of the surface treatment layer 61 and the application process is repeated until all of the coatings or layers that comprise the surface treatment layer 61 have been applied to the contoured surface 48. Alternatively, in other embodiments, subsequent layers are applied to the contoured surface 48 using one or more additional surface treatment assemblies 60, or other piece of surface treatment equipment. Once all of the desired coatings or layers which make up the surface treatment layer 61 have been applied, then in a next block 160, the surface treatment process determined to be complete and the fuselage 24 moves on to the next manufacturing or service step.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. An applicator assembly for treating a contoured surface, the applicator assembly comprising:
    an attachment frame configured to secure and position an applicator head, the applicator head being configured to apply a surface treatment to the contoured surface;
    at least one sensor operatively coupled to the attachment frame and configured to scan the contoured surface and produce a contoured data set; and
    an applicator actuator including a gimbal operatively coupled to the attachment frame and configured to pivotally support a base of the attachment frame such that the gimbal allows rotation of the attachment frame about an axis of the applicator assembly, wherein the applicator actuator further includes a first wheel having a first circumferential surface operably coupled to a surface of the gimbal, a second wheel having a second circumferential surface operably coupled to the surface of the gimbal, and wherein the first wheel and the second wheel are rotatably driven by an electric motor to rotate the attachment frame about the axis of the applicator assembly to maintain an orientation of the applicator assembly relative to the contoured surface.

2. The applicator assembly of claim 1, further comprising a controller communicably coupled to the applicator actuator and the at least one sensor, wherein the controller is configured to operate the applicator actuator to manipulate the attachment frame based on the contoured data set.

3. The applicator assembly of claim 2, wherein the at least one sensor comprises a surface scanning laser configured to scan the contoured surface to produce the contoured data set, and the contoured data set includes a contoured surface profile and a distance between the applicator assembly and the contoured surface.

4. The applicator assembly of claim 1, wherein the first circumferential surface of the first wheel is oriented perpendicular to the second circumferential surface of the second wheel, and the first and second wheels are independently driven by the electric motor such that the rotation of the attachment frame about the gimbal provides a plurality of rotational degrees of freedom to maintain the orientation of the applicator assembly according to the contoured surface.

5. The applicator assembly of claim 1, wherein the applicator head comprises an inkjet printing head configured to apply the surface treatment to the contoured surface, and the surface treatment is a decorative layer.

6. A surface treatment array for treating a contoured surface, the surface treatment array comprising:
    an adjustable base having at least a first radius and a second radius;
    a plurality of applicator assemblies coupled to the adjustable base, each applicator assembly of the plurality of applicator assemblies having an attachment frame configured to support and position an applicator head;
    at least one sensor operatively coupled to the attachment frame, each sensor configured to scan the contoured surface and produce a contoured data set;
    an adjustable base actuator operatively coupled to the adjustable base and configured to manipulate the adjustable base between at least the first radius and the second radius;
    an applicator actuator including a gimbal operatively coupled to the attachment frame of each applicator assembly of the plurality of applicator assemblies, and configured to pivotally support a base of the attachment frame such that the gimbal allows rotation of the attachment frame about an axis of each applicator assembly of the plurality of applicator assemblies, wherein the applicator actuator further includes a first wheel having a first circumferential surface operably coupled to a surface of the gimbal, a second wheel having a second circumferential surface operably coupled to the surface of the gimbal, and wherein the first wheel and the second wheel are rotatably driven by an electric motor to rotate the attachment frame about the axis of each applicator assembly of the plurality of applicator assemblies to maintain an orientation relative to the contoured surface; and
    a controller communicably coupled to the adjustable base actuator and programmed to operate the adjustable base actuator to manipulate the adjustable base between at least the first radius and the second radius, and to selectively operate each applicator assembly to apply a surface treatment to the contoured surface.

7. The surface treatment array of claim 6, wherein the controller is communicably coupled to the applicator actuator and the at least one sensor, and the controller is further configured to operate each applicator assembly of the plurality of applicator assemblies based on the contoured data set.

8. The surface treatment array of claim 7, wherein the at least one sensor comprises a surface scanning laser configured to scan the contoured surface to produce the contoured data set, and the contoured data set includes a contoured surface profile and a distance between each applicator assembly of the plurality of applicator assemblies and the contoured surface.

9. The surface treatment array of claim 6, wherein the first circumferential surface of the first wheel is oriented perpendicular to the second circumferential surface of the second wheel, and the first and second wheels are independently driven by the electric motor, so that the gimbal rotates the attachment frame about a plurality of rotational degrees of freedom thereby to maintain the orientation of each applicator assembly of the plurality of applicator assemblies relative to the contoured surface.

10. The surface treatment array of claim 6, wherein each applicator head comprises an inkjet printing head configured to apply the surface treatment to the contoured surface, and the surface treatment comprises a decorative layer.

11. A method of treating a contoured surface with a surface treatment array, the method comprising:

providing a plurality of applicator assemblies on an adjustable base, each applicator assembly of the plurality of applicator assemblies being configured to apply a surface treatment to the contoured surface;

determining an existing shape of the contoured surface;

manipulating the adjustable base with an adjustable base actuator to a desired base contour based on the determined existing shape of the contoured surface, thereby to position each applicator assembly relative to the contoured surface;

manipulating an applicator actuator including a gimbal operatively coupled to an attachment frame of each applicator assembly of the plurality of applicator assemblies, the gimbal configured to pivotally support a base of the attachment frame and allow rotation of the attachment frame about an axis of each applicator assembly of the plurality of applicator assemblies, wherein the applicator actuator further includes a first wheel having a first circumferential surface operably coupled to a surface of the gimbal, a second wheel having a second circumferential surface operably coupled to the surface of the gimbal, and wherein the first wheel and the second wheel are rotatably driven by an electric motor to rotate the attachment frame about the axis of each applicator assembly of the plurality of applicator assemblies to maintain an orientation of each applicator assembly of the plurality of applicator assemblies relative to the contoured surface; and selectively operating each applicator assembly of the plurality of applicator assemblies to apply the surface treatment along the contoured surface.

12. The method of claim 11, wherein each applicator assembly of the plurality of applicator assemblies further comprises at least one sensor, and determining the existing shape of the contoured surface comprises scanning the contoured surface with the at least one sensor to produce a contoured data set.

13. The method of claim 11, wherein each applicator assembly of the plurality of applicator assemblies comprises an inkjet printing head, and selectively operating each applicator assembly of the plurality of applicator assemblies comprises applying a decorative layer along the contoured surface.

* * * * *